United States Patent
Morris et al.

(10) Patent No.: US 9,202,083 B2
(45) Date of Patent: Dec. 1, 2015

(54) SYSTEMS AND METHODS FOR VERIFYING UNIQUENESS IN ANONYMOUS AUTHENTICATION

(71) Applicant: Partnet, Inc., Salt Lake City, UT (US)

(72) Inventors: Cameron Craig Morris, Salt Lake City, UT (US); Douglas M. Erickson, Salt Lake City, UT (US)

(73) Assignee: Partnet, Inc., Salt Lake City, UT (US)

(*) Notice: Subject to any disclaimer, the term of this patent is extended or adjusted under 35 U.S.C. 154(b) by 114 days.

(21) Appl. No.: 13/899,306

(22) Filed: May 21, 2013

(65) Prior Publication Data

US 2013/0318359 A1   Nov. 28, 2013

Related U.S. Application Data

(60) Provisional application No. 61/650,252, filed on May 22, 2012, provisional application No. 61/650,640, filed on May 23, 2012.

(51) Int. Cl.
| | | |
|---|---|---|
| *G06F 21/00* | (2013.01) | |
| *G06F 21/62* | (2013.01) | |
| *G06F 21/32* | (2013.01) | |
| *G06F 21/34* | (2013.01) | |
| *H04L 9/32* | (2006.01) | |

(52) U.S. Cl.
CPC ............ *G06F 21/6245* (2013.01); *G06F 21/32* (2013.01); *G06F 21/34* (2013.01); *G06F 21/62* (2013.01); *G06F 21/6254* (2013.01); *H04L 9/3213* (2013.01); *H04L 9/3231* (2013.01); *H04L 9/3234* (2013.01); *H04L 9/3257* (2013.01); *H04L 2209/42* (2013.01)

(58) Field of Classification Search
CPC ....................................................... H04L 9/32
USPC .......................................... 713/168, 185, 200
See application file for complete search history.

(56) References Cited

U.S. PATENT DOCUMENTS

| | | |
|---|---|---|
| 2002/0026578 A1 | 2/2002 | Hamann et al. |
| 2002/0112177 A1* | 8/2002 | Voltmer et al. ............... 713/200 |
| 2009/0070583 A1* | 3/2009 | von Mueller et al. ......... 713/168 |
| 2010/0039223 A1 | 2/2010 | Siedlarz |
| 2010/0122094 A1 | 5/2010 | Shima |

FOREIGN PATENT DOCUMENTS

WO   2011160683 A1   12/2011

OTHER PUBLICATIONS

"Biometric-based non-transferable anonymous credentials"; M Blanton et al; Information and Communications Security, 2009; 16 pages.*

(Continued)

*Primary Examiner* — Jason Lee
(74) *Attorney, Agent, or Firm* — Austin Rapp & Hardman

(57) ABSTRACT

A method for anonymous authentication by an electronic device is described. The method includes obtaining biometric data. The method also includes generating a token. The method also includes blinding the token to produce a blinded token. The method also includes sending the blinded token and biometric information based on the biometric data to a verifier. The method also includes receiving a signature of the blinded token from the verifier if corresponding biometric information is not stored by the verifier.

14 Claims, 10 Drawing Sheets

(56) References Cited

OTHER PUBLICATIONS

"An application of the Boneh and Shacham group signature scheme to biometric authentication"; J Bringer et al; Proceedings of the 3rd International Workshop on Security (IWSEC '08) Nov. 25-27, 2008, Kagawa, Japan; 12 pages.*

International Search Report and Written Opinion issued for International Application No. PCT/US2013/042265 on Dec. 16, 2013.

* cited by examiner

US 9,202,083 B2

SYSTEMS AND METHODS FOR VERIFYING UNIQUENESS IN ANONYMOUS AUTHENTICATION

RELATED APPLICATIONS

This application is related to and claims priority from U.S. Provisional Patent Application Ser. No. 61/650,640, filed May 23, 2012, for "STORING AN ENCRYPTED BIOMETRIC TEMPLATE ON A CENTRAL DATABASE," which is incorporated herein by reference. This application is also related to and claims priority from U.S. Provisional Patent Application Ser. No. 61/650,252, filed May 22, 2012, for "VERIFYING UNIQUENESS IN ANONYMOUS AUTHENTICATION," which is incorporated herein by reference.

TECHNICAL FIELD

The present disclosure relates generally to communication systems. More specifically, the present disclosure relates to systems and methods for verifying uniqueness in anonymous authentication.

BACKGROUND

Communications systems are widely deployed to provide various types of communication content such as voice, video, data and so on. These systems increase productivity, communication and the availability of information.

As communication systems expand, many people are able to gain access to valuable information. However, the structures of communication systems, such as the Internet and other networks, also create potential problems. In many cases, people often decide between accuracy of information and privacy. For example, a person may be able to access sensitive data, but may have to sacrifice anonymity to do so. On the other hand, a person may be able to stay anonymous, but may not be able to access sensitive information as a result. Therefore, systems and methods that improve authentication may be beneficial.

DETAILED DESCRIPTION

Figure 1:
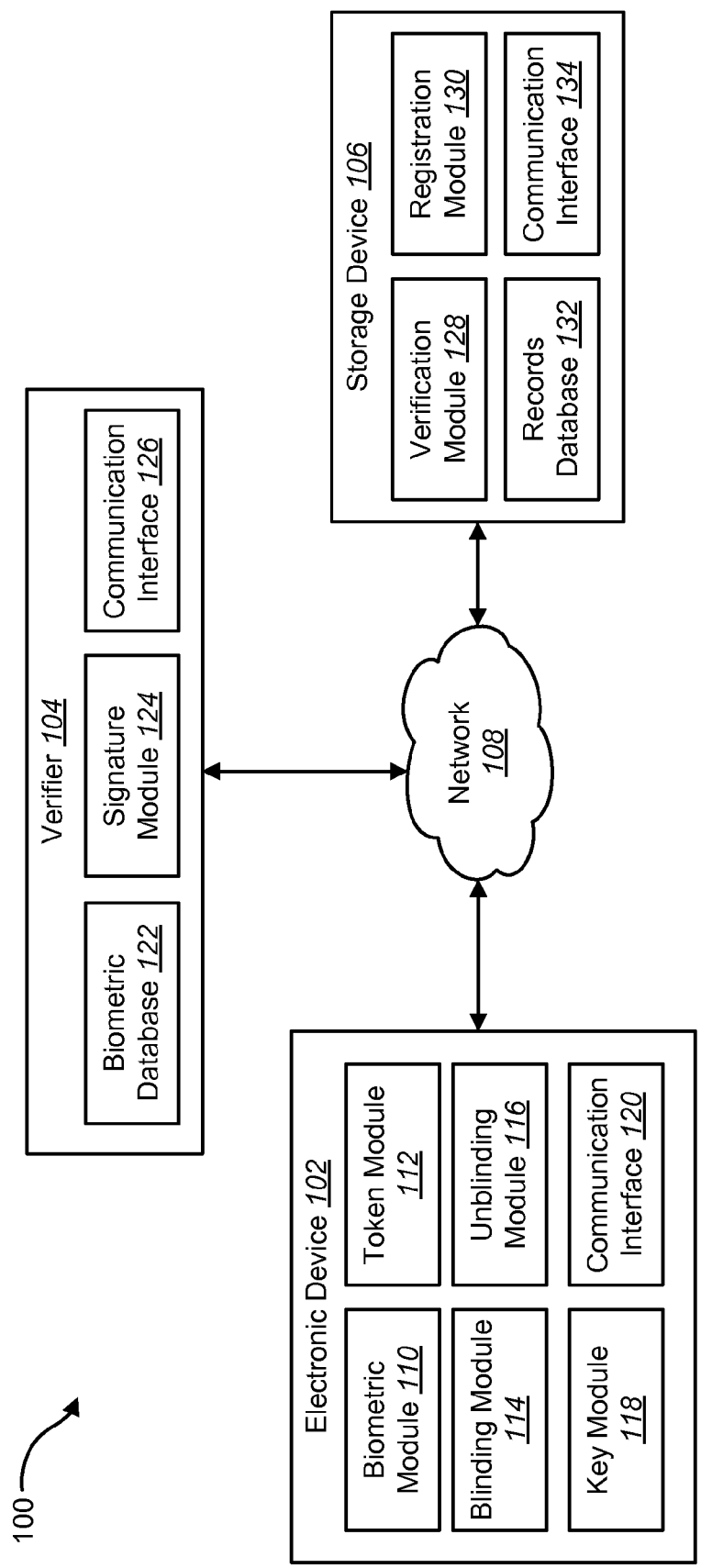
FIG. 1 is a block diagram illustrating one configuration of a system for verifying uniqueness in anonymous authentication.

A method for anonymous authentication by an electronic device is described. The method includes obtaining biometric data. The method also includes generating a token. The method also includes blinding the token to produce a blinded token. The method also includes sending the blinded token and biometric information based on the biometric data to a verifier. The method also includes receiving a signature of the blinded token from the verifier if corresponding biometric information is not stored by the verifier.

The method may also include sending the token and the signature to a storage device. The method may also include obtaining access to privacy sensitive information from the storage device if the signature is authenticated by the storage device. The method may also include unblinding the received signature to produce an unblinded signature.

The method may also include obtaining additional biometric data. The method may also include sending additional biometric information based on the additional biometric data to the verifier to determine whether the additional biometric information corresponds to biometric information stored on the verifier. The method may also include receiving an indication from the verifier whether the additional biometric information corresponds to biometric information stored on the verifier. The method may also include receiving an indication that a patient associated with the additional biometric information has previously received a signature for obtaining access to privacy sensitive information.

The method may also include generating a public key and a private key. The method may also include storing the public key, the signature and the token on a smart card. The method may also include encrypting privacy sensitive information using the public key. The method may also include authenticating a signature and a token using the public key. The method may also include decrypting privacy sensitive information using the private key.

The method may also include generating a new token. The method may also include sending biometric data and the new token to the verifier. The method may also include receiving a new signature and the new token. The method may also include reenrolling the new signature with a storage device.

An electronic device for performing anonymous authentication is also described. The electronic device includes a processor and memory in electronic communication with the processor. The electronic device also includes instructions stored in memory. The instructions are executable to obtain biometric data. The instructions are also executable to generate a token. The instructions are also executable to blind the token to produce a blinded token. The instructions are also executable to send the blinded token and biometric information based on the biometric data to a verifier. The instructions are also executable to receive a signature of the blinded token from the verifier if corresponding biometric information is not stored by the verifier.

A method for anonymous authentication by a verifier is also described. The method includes receiving biometric information and a blinded token from an electronic device.

The method also includes comparing the received biometric information to stored biometric information on a database. The method also includes verifying an enrollment status of the received biometric information.

Systems and methods described herein include an electronic device for verifying uniqueness in anonymous authentication. In obtaining records about one or more individuals (e.g., patients), there are many concerns regarding the accuracy of information and privacy of individuals associated with various records (e.g., privacy sensitive information, medical records). For example, health care providers (e.g., hospitals, clinics, insurance providers) and other organizations depend on accurate information about patients, including histories and identities of patients in providing the best health care possible. However, there is also an interest in preserving the privacy of patients that may limit the ability of health care providers from obtaining the most accurate and up-to-date information about a patient. A benefit of verifying uniqueness in anonymous authentication is that the identity of an individual may be verified without revealing personal details about the individual. Further, in addition to accurate verification, health care providers may obtain accurate and up-to-date records when treating a patient. Thus, by using anonymous authentication, the privacy of a patient may be protected while still permitting health care providers to obtain accurate information about patients.

Although some of the systems and methods are described in relation to health care patients and associated medical records, the systems and methods may be applied to a wide variety of individuals and various types of information associated with those individuals. Therefore, as used herein, a "patient" may include a patient requesting health treatment or any person associated with biometric information, tokens, signatures and records on a storage device. Further, "records" on a storage device may refer to any kind of information (e.g., privacy sensitive information) for which access may be restricted by an individual with an interest in access to or the distribution of that information.

By obtaining a signature from a verification device, an electronic device may provide a signature to verify to a storage device (e.g., a health database system) that a patient has been anonymously verified without revealing the identity or personal information about a patient. Thus, up-to-date and accurate medical records may be obtained while respecting the privacy of individuals seeking health care. Further, because signatures, tokens and/or keys may be distributed among multiple devices, and encrypted and/or blinded using various arithmetic operations, relationships between biometric information, records and personal information may remain anonymous unless express consent is given by a patient for access to the privacy sensitive information on a storage device. In some configurations, a "storage device" may include a health database system, including a database of medical records and/or other privacy sensitive information. In one configuration, a storage device may be a medical record and patient security (MRPS) system. Additionally or alternatively, a "storage device" may include one or more storage devices in some configurations, including one or more devices and/or a cloud computing space.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods. As used herein, the term "plurality" may indicate two or more. For example, a plurality of components refers to two or more components.

FIG. 1 is a block diagram illustrating one configuration of a system 100 for verifying uniqueness in anonymous authentication. An electronic device 102 may be in communication with a verifier 104 and one or more storage devices 106 using a network 108. Examples of an electronic device 102 may include servers, personal computers (PCs), laptop computers, tablet devices, smartphones or other kinds of electronic and computing devices. The electronic device 102 may be controlled by a user and/or health care provider. The verifier 104 and one or more storage devices 106 may also include one or more similar electronic or computing devices. The electronic device 102 may include one or more software utilities for performing the functions of the systems and methods described herein.

The electronic device 102 may include a biometric module 110. The biometric module 110 may be a hardware and/or software module used to obtain biometric data and perform one or more operations on the biometric data. For example, the biometric module 110 may include hardware and/or software for scanning or capturing biometric data from a patient. Biometric data may be obtained through a variety of techniques, including a palm vein scan, palm print, fingerprint, retinal scan, face recognition scan, blood sample or other method for capturing data that may be used to identify a patient. Obtaining biometric data may also require an active scan, such as a palm vein scan or other scan that cannot be obtained passively. In some configurations, the biometric module 110 may obtain multiple types of biometric data from a single patient. The biometric module 110 may be implemented as part of the electronic device 102 or alternatively on a separate device (e.g., remote device) in communication with the electronic device 102. Additionally or alternatively, the biometric module 110 may be implemented partially on a separate device and partially on the electronic device 102. For example, a separate biometric (e.g., palm vein) scanner may be coupled to the electronic device 102 and the electronic device 102 may include a module for receiving biometric data from the scanner and for generating biometric information based on the biometric data. In this example, the biometric module 110 may be accordingly implemented partially on a separate device and partially on the electronic device 102.

The biometric module 110 may generate biometric information based on the biometric data. Biometric information may include some or all of the biometric data or a biometric template based on the biometric data. Further, biometric information based on the biometric data may include any information based on the biometric data that may be stored on a database. Stored biometric information may be compared to subsequently obtained biometric data to determine a match between the stored biometric information and subsequently obtained biometric data.

In one example, biometric information may include a biometric template generated from the biometric data. A biometric template may indicate one or more details of the biometric data for determining a match between the biometric template and the biometric data. The biometric template may also be used to determine a match between the biometric data and subsequently obtained biometric data. The biometric template may be a digital representation of the biometric data itself. In some configurations, the biometric template may be a reduced or compressed version of the biometric data. For example, the biometric template may be a parameterized representation of the biometric data (e.g., characteristics of the biometric data such as sizes, distances, features and/or numbers of features, etc.). For instance, in the case of biometric data being obtained through a fingerprint, the biometric template may include any data that can be utilized for matching a subsequent fingerprint with the biometric template. Thus, a biometric template may include any data for determining a match between the biometric data of a patient and the biometric template created by the biometric module 110.

In some configurations, the biometric template may be a reduced version of the biometric data, including a portion of the biometric data that may be used in determining a match between the biometric template and subsequently obtained biometric data. A biometric template may be generated for a patient the first time a patient provides biometric data or upon a specific request for verification of an electronic device 102 and/or patient. The biometric template may also be used in connection with generating a smart card that may be used for verifying the identity of a patient or electronic device 102. In some configurations, the biometric template may be encrypted by the electronic device 102 prior to being sent to any other devices (e.g., a verifier 104) over the network 108.

The electronic device 102 may also include a token module 112. The token module 112 may include hardware and/or software for generating one or more tokens. A token may be a random number or sequence of numbers. In some configurations, one or more tokens may be generated by a separate device (e.g., a payer, a provider, a storage device 106). The token may be stored on the electronic device 102 for later use, such as for storage on (e.g., programming) a smart card. In some configurations, the token is not stored on the electronic device 102 once the token is sent to another device (e.g., a verifier 104). Thus, in some cases, the electronic device 102 may only generate one copy of a token.

The electronic device 102 may also include a blinding module 114. The blinding module 114 may include hardware and/or software for blinding or encrypting one or more tokens or other objects. A token or other object may be blinded using a blinding factor. A blinded token may be a function of a token and a blinding factor. In some configurations, the blinding factor is known only by the electronic device 102. Blinding the token may include performing one or more arithmetic operations on the token based on the blinding factor. Blinding the token may prevent one or more devices from obtaining a specific value of the token before the token was blinded.

The electronic device 102 may also include an unblinding module 116. The unblinding module 116 may include hardware and/or software for unblinding or decrypting one or more signatures or other objects. In one example, the unblinding module 116 may unblind a signature of a token (e.g., blinded token) received over the network 108. Unblinding a signature may include performing one or more arithmetic operations on the blinded signature.

The electronic device 102 may also include a key module 118. The key module 118 may include hardware and/or software for generating one or more public keys and/or private keys for encrypting and decrypting data. For example, a public key may be generated for encrypting biometric information obtained and/or generated by the electronic device 102. A private key may also be generated for later decrypting the encrypted biometric information. Further, one or more public and/or private keys may be stored on a separate device or medium (e.g., a smart card, thumb drive, optical disc, etc.). The public and private key pairs may be used for encrypting and decrypting biometric information. Additionally or alternatively, public key and private key pairs generated by the electronic device 102 may be used for encrypting and decrypting tokens and/or other data communicated over a network 108. In another configuration, a public key and private key combination may be used for encrypting and decrypting privacy sensitive information stored on the storage device 106.

The electronic device 102 may also include a communication interface 120. The communication interface 120 may include hardware and/or software for communicating with one or more electronic and computing devices. The communication interface 120 may be used to send and receive communications to a storage device 106, verifier 104, smart card and/or other device. The communication interface 120 may be used to communicate with a variety of electronic and/or computing devices over a network 108.

The electronic device 102 may communicate with a verifier 104 and a storage device 106 over a network 108. The network 108 may be a computer network such as a Local Area Network (LAN), Wide Area Network (WAN), Public Switched Telephone Network (PSTN), cellular phone network, Internet, Intranet or other medium that may be used for transferring data between an electronic device 102 and one or more devices (e.g., verifier 104, storage device 106) over the network 108. In some configurations, the network 108 may be used to facilitate communication between multiple electronic and computing devices as well as additional storage devices 106.

The verifier 104 may be used to verify biometric information and/or other data received from the electronic device 102. The verifier 104 may include hardware and/or software for storing biometric information and generating one or more signatures and/or tokens based on a comparison of received biometric information to the stored biometric information. The verifier 104 may be a remote device from both the electronic device 102 and one or more storage devices 106. In one configuration, the verifier 104 may be an anonymous biometric cloud (ABC) for storing biometric information unrelated to other patient identifiers or other personal or demographic information. The verifier 104 may include an anonymous database used to store biometric information without any additional personal data (e.g., social security information, demographic information, personal identification information, etc.) for determining the identity of a person associated with the biometric information. In some configurations, personal identification data other than biometric information may be stored on a remote device separate from the verifier 104 and/or electronic device 102.

The verifier 104 may include a biometric database 122. The biometric database 122 may be used to store biometric information based on biometric data obtained by the electronic device 102. Storing the biometric information on the biometric database 122 may be accomplished upon initial verification or enrollment of a patient when biometric information for a patient is first received. In one configuration, the biometric database 122 may store one or more biometric templates generated by the electronic device 102. Thus, the verifier 104 may include a biometric database 122 having one or more biometric templates based on biometric data from various patients. In some configurations, the biometric information may be encrypted for additional security (e.g., using a public key). In one configuration, the biometric information may be encrypted by the electronic device 102. Alternatively, the verifier 104 may encrypt the biometric information stored on the biometric database 122. In some configurations, the electronic device 102 or verifier 104 may also decrypt the biometric templates using a private key provided by the electronic device 102 or another device or storage medium (e.g., smart card, thumb drive, optical disc, etc.).

The verifier 104 may also include a signature module 124. The signature module 124 may include hardware and/or software for generating one or more signatures. Specifically, the verifier 104 may receive biometric information and a token from the electronic device 102. The verifier 104 may determine whether the received biometric information corresponds to biometric information stored on the biometric database 122 and/or provide an indication as to whether the biometric information corresponds to stored biometric information already stored on the biometric database 122. If the received biometric information does not correspond to any of the biometric information on the biometric database 122, the verifier 104 may generate a signature for the token. If the received biometric information already corresponds to biometric information on the biometric database 122, the verifier 104 may be configured to not generate a signature for the token and/or provide an indication to the electronic device 102 that matching or corresponding biometric information already exists on the biometric database 122. Matching or corresponding biometric information may indicate that a patient has already enrolled in the system 100 or has previously received a signature for obtaining access to a storage device 106.

The verifier 104 may also include a communication interface 126. The communication interface 126 may be a hardware and/or software module used to communicate with one or more electronic and computing devices. Specifically, the communication interface 126 may be used to send and receive communications to the electronic device 102 and verifier 104 over the network 108. The storage device 106 may use the communication interface 126 to send/receive privacy sensitive information, records, signatures, encryption and decryption keys and/or other data over the network 108.

The storage device 106 may be used for storing privacy sensitive information accessible to the electronic device 102 or other device over the network 108. The storage device 106 may also register or otherwise establish a relationship with the verifier 104 such that one or more signatures originating from the verifier 104 may be used for authenticating one or more electronic devices 102 or requests for privacy sensitive information stored on a database. The storage device 106 may receive a request for privacy sensitive information from an electronic device 102 and provide access to privacy sensitive information over the network 108 based on a signature provided from the verifier 104. Additionally, a public key on the storage device 106 or provided from the electronic device 102 or a smart card may be used for authenticating the signature and the token provided to the storage device 106.

The storage device 106 may include a verification module 128. The verification module 128 may be a hardware and/or software module used to verify or authenticate a signature received from the electronic device 102. The verification module 128 may verify that an electronic device 102 is trusted based on the signature or may determine that a specific request for information is trusted based on the signature. The verification module 128 may also be used to determine whether a signature originates from a registered or trusted verifier 104, and has been properly verified by the verifier 104 or other device. Further, the verification module 128 may be used for receiving one or more public and/or private keys that may be used when authenticating a request for privacy sensitive information or for determining a match between received biometric data and privacy sensitive information (e.g., medical records) stored on a database. Further, the verification module 128 may be used for authentication of verification of the identity of a patient when data is received via a smart card. Thus, the verification module 128 may be used to verify or authenticate a verifier 104, electronic device 102, a patient, a smart card or other data received from a device over the network 108.

The storage device 106 may also include a registration module 130. The registration module 130 may be used for registering a verifier 104, provider, payer, electronic device 102 or other device capable of providing a signature and/or tokens that may be used for verification or authentication of a patient or electronic device 102. The registration module 130 may also be used to register an individual with a specific signature. For example, the registration module 130 may be used to provide data for programming a smart card and/or a health card. For example, the storage device 106 may send information for programming a smart card to the electronic device 102. The smart card may include one or more encryption and/or decryption keys, blinding factors, signatures and other data that may be used for verifying the identity of a patient. In some configurations, the storage device 106 may program a smart card. Alternatively, the storage device 106 may provide keys, signatures, blinding factors and/or other data to the electronic device 102 for programming a smart card. Data on the smart card may be used for obtaining access to privacy sensitive information on the storage device 106.

The storage device 106 may also include a records database 132. The records database 132 may be used to store privacy sensitive information. In one configuration, the privacy sensitive information may include records (e.g., medical records) of patients. The privacy sensitive information may be encrypted using a public key. In one configuration, the privacy sensitive information may be encrypted using a similar encryption key as used when encrypting the biometric information. Further, the records may be encrypted on a record-by-record basis, with each of the records and other privacy sensitive information being encrypted differently for each patient. Thus, the exchange of keys between the verifier 104 and the electronic device 102 may also include a similar exchange of keys between the electronic device 102 and the storage device 106. Alternatively, the privacy sensitive information may be stored using a different encryption as the encryption keys generated by the electronic device 102 such that only the storage device 106 may decrypt the privacy sensitive information upon authentication of a signature received from the electronic device 102. In some configurations, one or more links between the privacy sensitive information and the identities of individuals associated with the privacy sensitive information may be included within the records database 132 such that any link between biometric information, personal information and privacy sensitive information may be protected until a received signature is authenticated by the storage device 106. In some configurations, privacy sensitive information stored in the records database 132 may not be encrypted. However, even if the privacy sensitive information is not encrypted, the identity of one or more patients associated with the privacy sensitive information may be anonymous without first receiving and verifying a signature from the electronic device 102. Thus, whether or not the privacy sensitive information is encrypted or readily accessible, it may be difficult or impossible to determine the identity of a patient associated with the privacy sensitive information until biometric information and/or a signature is verified and authenticated.

The storage device 106 may also include a communication interface 134. The communication interface 134 may be a hardware and/or software module used to communicate with one or more electronic and computing devices. The communication interface 134 may be used to send and receive communications to an electronic device 102 and/or verifier 104 over the network 108. For example, the communication interface 134 may be used to send/receive signatures, registration information (e.g., registration of a smart card), authentication information and other data to the electronic device 102 and/or the verifier 104.

The electronic device 102 may be used to obtain biometric data from a patient. The electronic device 102 may obtain the biometric data using a variety of techniques. In some configurations, the electronic device 102 may obtain multiple types of biometric data from each patient in the case that one type of biometric data is insufficient or in cases where a specific device for obtaining a certain type of biometric data is unavailable. Further, obtaining multiple types of biometric data may provide enhanced security of biometric information.

The electronic device 102 may generate biometric information based on the biometric data. Biometric information may include some or all of the biometric data or a biometric template based on the biometric data. Storing the biometric information on the verifier 104 may be performed when enrolling or verifying the biometric information for the first time. In some configurations, the electronic device 102 may also obtain additional biometric data at a subsequent time. The stored biometric information may be compared to the additional biometric data to determine a match between the stored biometric information and additional biometric data. In some configurations, the electronic device 102 may generate a biometric template for each type of biometric data obtained by the electronic device 102.

The electronic device 102 may optionally encrypt the biometric information prior to sending the biometric information to one or more devices over a network 108. Encrypting the biometric information may be performed using a public key. The electronic device 102 may also generate a private key for later decrypting the encrypted biometric information. The public key and private key may be stored on a device or a storage medium (e.g., a smart card) that may be provided to a user. The public key may be also distributed among one or more devices (e.g., a smart card, verifier 104, storage device 106). In some configurations, a smart card provided to a user may be the only storage medium on which the private key is stored.

The electronic device 102 may also generate a token. The token may be a random number or sequence of numbers. The token may be blinded by the electronic device 102 using a blinding factor. Blinding the token may produce a blinded token. The blinded token may be a function of the token and the blinding factor.

It is noted that one or more functions described in connection with the electronic device 102 may be performed by one or a combination of electronic devices 102. For example, a first electronic device may obtain biometric data while a second electronic device generates biometric information based on the biometric data. In another configuration, a first electronic device may be used for enrolling a patient with the verifier while a second electronic device may be used when obtaining privacy sensitive data from the storage device 106. Thus, as used herein, the "electronic device" 102 may refer to one or multiple electronic devices performing various functions in connection with verifying biometric information and authentication with a storage device 106.

Once the biometric information, blinded token and any encryption and decryption keys (e.g., public and private keys) are generated, the electronic device 102 may send the biometric information and the blinded token to the verifier 104. The verifier 104 may receive the biometric information and a blinded token and verify whether the biometric information corresponds to biometric information already stored on the biometric database 122. If the biometric information does not match or correspond to any of the biometric information on the biometric database 122, the verifier 104 may store the biometric information on the biometric database 122 and generate a signature of the blinded token. The verifier 104 may then provide the signature to the electronic device 102. In some configurations, the signature of the blinded token is a blinded signature. The signature may be blinded according to the same blinding factor as the blinded token. Alternatively, if the biometric information received by the verifier 104 matches or corresponds to biometric information already stored on the biometric database 122, the verifier 104 may determine that the received biometric information has been previously enrolled and decline to generate a signature of the blinded token. Further, the verifier 104 may generate an indication that the received biometric information already matches biometric information previously stored on the biometric database 122, and that an individual associated with the biometric information has been previously enrolled on the biometric database 122 and/or already received a smart card.

The signature may be sent to the electronic device 102. Further, the signature and/or other information (e.g., token, public key, private key, biometric information, etc.) may be stored on a smart card by the electronic device 102. Thus, communications between the electronic device 102 and the verifier 104 may be for verifying a patient with biometric information stored on the biometric database 122 and sending the electronic device 102 a signature.

Once the electronic device 102 has obtained the signature, the electronic device 102 may unblind the signature. Because the signature may be blinded using the same blinding factor as used for blinding the token, the electronic device 102 may use the same blinding factor or a corresponding unblinding factor to unblind or decrypt the blinded signature. In some configurations, the electronic device 102 may program a smart card with the token and/or unblinded signature. The smart card may be used by a patient when establishing that their biometric information has been previously verified and that they are authorized to obtain access or permit obtaining access to privacy sensitive information on the storage device 106. Alternatively, the electronic device 102 may use the token and unblinded signature to establish a trusted relationship between the electronic device 102 and the storage device 106 for obtaining access to certain privacy sensitive information pertaining to a specific patient or biometric information associated with the patient.

The electronic device 102 may send the token and unblinded signature to the storage device 106. Alternatively, a programmed smart card containing the token and unblinded signature may be used to send the token and unblinded signature to the storage device 106. The storage device 106 may also determine whether the signature originated from a verifier 104. If the signature originates from a verifier 104 that is recognized and trusted (e.g., registered) by the storage device 106, the storage device 106 may provide access to privacy sensitive information on a records database 132.

In some configurations, the storage device 106 may receive the unblinded signature, and provide data to an electronic device 102 for programming a smart card. The electronic device 102 may program the smart card with any information needed for later accessing privacy sensitive information corresponding to the token, signature and/or biometric information. For example, the storage device 106 may send information, such as keys, tokens and/or other data to enable the electronic device 102 to program a smart card for later access to the privacy sensitive information. The smart card may then be used by a patient for accessing privacy sensitive information on the storage device 106 (e.g., the records database 132).

Any information or identifiers needed for accessing privacy sensitive information on the storage device 106 may be solely located on the smart card, such that access to the privacy sensitive information is unavailable without the keys, tokens and/or other information stored on the smart card. In one example, the storage device 106 may generate a global identification for a patient in response to receiving a verified signature. The storage device 106 may further generate a patient identification and link the patient identification with the global identification. The patient identification and/or the global identification may also be linked with a payer or other electronic device. In some configurations, the storage device 106 may generate one or more global identifications for all dependents associated with an account of a primary patient. These various identifications may be provided to the electronic device 102 for programming a smart card. In addition to one or more keys, tokens, signatures and/or other data, the various identifications may also be stored on a smart card and used for verifying or authenticating a patient with the storage device 106. By generating a patient identification as well as a global identification, it may be possible to re-enroll a patient with a different insurance provider, while still maintaining the global health history of a patient. Thus, when re-enrolling a patient or electronic device 102, the patient identification may be changed while maintaining a global identification associated with the account. This global identification may be used for linking a new patient identification with accurate and up-to-date health records when switching between insurance companies or providers.

In another configuration, an electronic device 102 may re-enroll a patient with a verifier 104. For example, the electronic device 102 may generate a new private key and a public key pair for a new card. The electronic device 102 may also generate a new token, which may be blinded using a blinding factor. The electronic device may send the blinded token to the verifier 104 with instructions for re-enrolling a patient associated with biometric information and the new token. The verifier 104 may generate a new signature and send the new signature to the electronic device 102. Further, the electronic device 102 may obtain information from an old smart card, and enroll the new signature via the smart card with the storage device 106. Enrolling the new signature may include providing data from the old health card to the storage device 106, sending the new signature (e.g., an unblinded signature) to the storage device 106 and receiving encrypted biometric information from the storage device 106 associated with privacy sensitive information. The electronic device 102 may decrypt the biometric information using an old private key, encrypt the biometric information using the new public key, send the re-encrypted biometric information to the storage device 106 and update any biometric information, keys and/or tokens associated with the new account. The electronic device 102 may then generate a new smart card using the new keys, signature, tokens and/or other data.

In some configurations, a patient may also manage any permissions associated with respective privacy sensitive information. For example, where a patient may desire that certain records are kept secret, they may still permit various records to be made public or readily accessible to providers, clinics, insurance companies and/or other organizations. In one configuration, a patient may authenticate to a storage device 106 using a smart card to obtain access to privacy sensitive information. The patient may manually configure access to the privacy sensitive information using a variety of preferences (e.g., deny all, allow all, deny some, allow some, etc.) applied to various categories so as to segment privacy sensitive information, such as health records dealing with different types of health matters. For example, a patient may choose to deny access to records associated with psychiatric care or research while permitting access to records associated with heart health or a family practice. Various exceptions or preferences may also be applied to different providers, so as to permit certain organizations (e.g., health care providers, dependents, etc.) access to privacy sensitive information while preventing access by other parties or organizations (e.g., the public, insurance companies, etc.). Preferences may be applied to organizations at the discretion of a patient and/or in compliance with various laws or regulations.

By exchanging the blinded token and blinded signature between the verifier 104 and the electronic device 102, any information that may be obtained from the blinded token and signature may be protected without access to the blinding factor. Further, by transferring the unblinded token and the unblinded signature between the electronic device 102 and the storage device 106, none of the same information is transferred between the electronic device 102 and storage device 106 as is transferred between the electronic device 102 and the verifier 104. Thus, even if the operators of the verifier 104 and the storage device 106 were to work together to obtain access to privacy sensitive information, the signature and tokens exchanged over the network 108 would be protected without additional collaboration from either the electronic device 102 or the owner of the smart card. In some cases, where a token and/or blinding factor are not stored on the electronic device 102, and whose only copies are stored on a smart card, it may be difficult or impossible to obtain access to privacy sensitive information on the storage device 106 without express permission of a patient in possession of the smart card. Thus, the privacy sensitive information may be protected as well as the identity of an individual associated with the privacy sensitive information.

Further, the system 100 may include additional levels of security and/or a combination of the various forms of security discussed herein. For example, the system 100 may include verification of one or a combination of various types of information. Types of information may include one or more types of biometric data, encryption and decryption keys, blinding and unblinding factors, verification signatures, tokens, smart cards, personal identification numbers (PINs) or other information about a patient that may be used when attempting to access privacy sensitive information stored on a storage device 106. While not each of these levels of security are required, the storage device 106 may be instructed or programmed to provide privacy sensitive information or access to the privacy sensitive information stored on the records database 132 only if one or a combination of these security measures are satisfied. Thus, obtaining access to the privacy sensitive information may be very difficult or impossible without the express permission of an individual associated with the privacy sensitive information. However, even with multiple levels of security, access to privacy sensitive information may be reasonably obtained with express permission of a patient in possession of a smart card, where the smart card provides any necessary tools for decrypting, verifying and/or authorizing access to the privacy sensitive information.

Moreover, the electronic device 102 and the verifier 104 may update any biometric information on the biometric database 122. For example, certain types of biometric data, such as a palm vein scan, face recognition or biometric data including other changing features may change gradually over time. Therefore, the electronic device 102 and the verifier 104 may update any biometric information periodically to more accurately represent changing biometric data. In verifying a changed scan, the verifier 104 may store multiple types of biometric information on the biometric database 122, including types of biometric data, such as a blood sample, a fingerprint or other type of biometric information that is less likely to change over time. Thus, the electronic device 102 may obtain updated biometric data and send update biometric information to the verifier 104 based on the updated biometric data. The electronic device 102 may also obtain an unchanging type of biometric data (e.g., a fingerprint, blood sample, etc.) and provide biometric information corresponding to the unchanging type of biometric data to the verifier 104. The verifier 104 may then compare the received biometric information to information stored on the biometric database 122 to determine whether the received biometric information matches biometric information already stored on the biometric database 122. If the received biometric information matches or corresponds to biometric information on the biometric database 122, the verifier 104 may replace the biometric information associated with a specific patient with the updated biometric information provided from the electronic device 102. The updated biometric information may then be used for verifying future biometric information provided by the electronic device 102. In some configurations, the electronic device 102 may receive a new signature and program a smart card according to any updated information.

Other benefits of the system 100 for verifying uniqueness in anonymous authentication may include more accurate health records, including a full history of patient records across multiple providers of care, ensuring correct records are associated with correct patients, improving the quality and efficacy of care and providing Medicate Accountable Care Organizations (ACOS) with a mechanism for access to records and other privacy sensitive information outside of a health system. Further benefits may include preventing fraudulent access to care, identifying misidentified patients, minimizing the ability of patients to manipulate the health care system, lower risks, lower costs and a higher compliance with state and federal laws dealing with privacy and consent.

Figure 2:
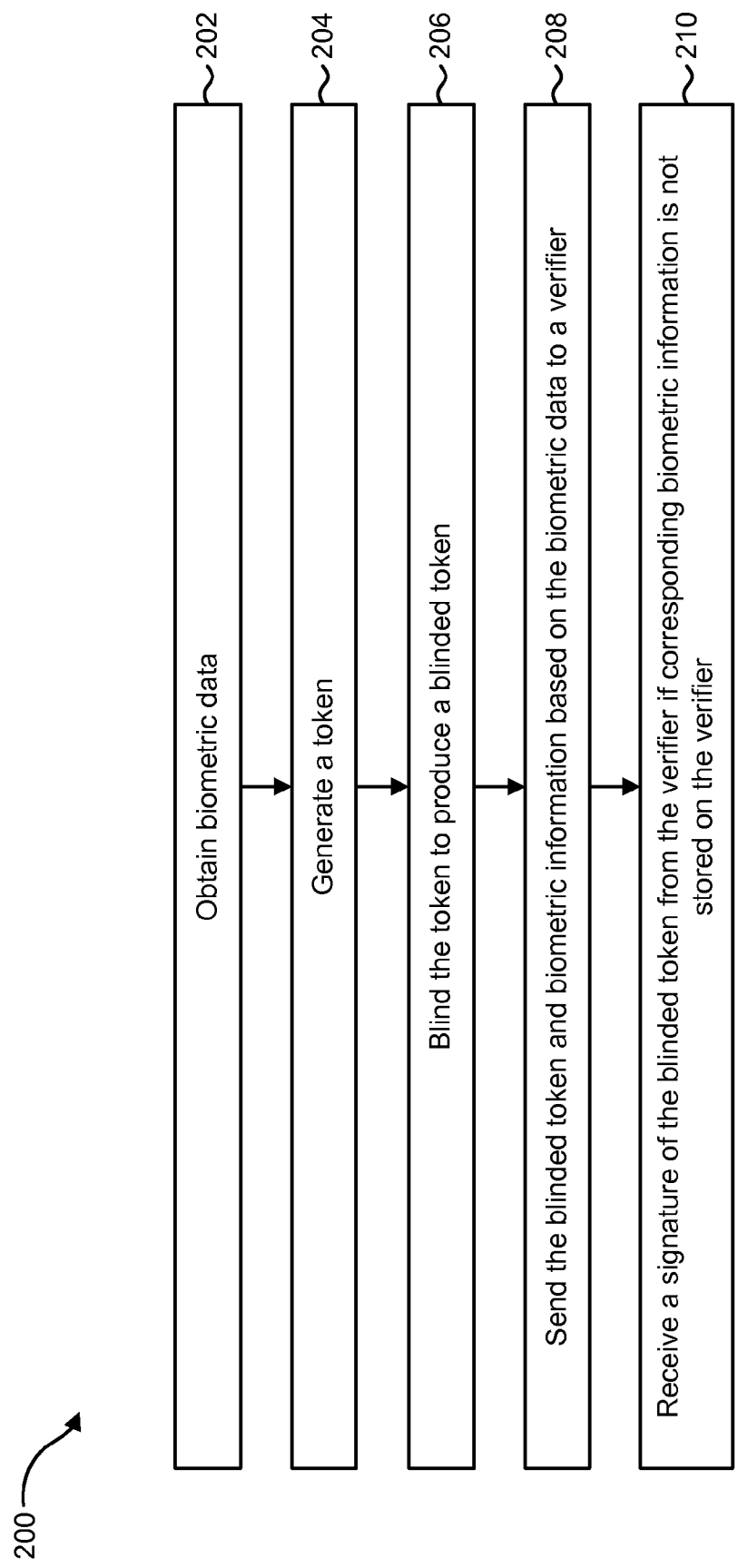
FIG. 2 is a flow diagram illustrating one configuration of a method for verifying uniqueness in anonymous authentication.

FIG. 2 is a flow diagram illustrating one configuration of a method 200 for verifying uniqueness in anonymous authentication. In one configuration, the method 200 may be performed by an electronic device 102 (e.g., computing device, server, smart phone, etc.).

Biometric data may be obtained 202. The biometric data may be obtained 202 using a variety of devices and techniques. For example, biometric data may be obtained 202 using a fingerprint scanner, a thumb print scanner, a handprint or palm scanner, a vein scanner (e.g., a palm vein scanner), an eye scanner or other device capable of capturing data that may be used to identify a person. The biometric data may include any information or data that may be used in identifying a patient. Examples of biometric data include fingerprints, palm prints, vein scans and other types of data for identifying a patient. Additionally, multiple types of biometric data may be obtained for each patient. Therefore, in cases where a certain device for capturing biometric data is unavailable or when a type of biometric data may not be obtained (e.g., when the biometric data source, such as a hand, eye, finger, etc., has been injured), an electronic device 102 may obtain different types of biometric data that may be used in verifying uniqueness of the obtained biometric data.

A token may be generated 204. In one configuration, the token may be a random number or sequence of numbers. Further, one or more tokens may be generated by a separate device (e.g., a payer, a provider, a storage device). In some cases, the token is not stored on the electronic device 102, and the electronic device 102 does not store a copy of the token once sent to another device (e.g., a verifier 104). Thus, in some cases, the electronic device 102 may only generate 204 one copy of a token. Alternatively, the token may be stored on the electronic device 102 for later use, such as programming a smart card.

The token may be blinded 206 to produce a blinded token. The token may be blinded 206 using a blinding factor. The blinded token may result from a function of the token and the blinding factor. Specifically, blinding 206 the token may include performing one or more arithmetic operations on the token based on the blinding factor.

Biometric information based on the biometric data may be sent 208 to a verifier 104. The blinded token may also be sent 208 to the verifier. The biometric information may include some or all of the biometric data and/or a biometric template based on the biometric data. This biometric information as well as the blinded token may be sent 208 to the verifier 104 to verify an enrollment status of the biometric information. Verifying an enrollment status may include determining whether biometric information already exists on a biometric database 122. If corresponding biometric information already exists on the biometric database 122, an enrollment status may be determined to be previously verified or enrolled. Conversely, if corresponding biometric information does not already exist on the biometric database 122, an enrollment status may be determined to be not previously verified or not enrolled.

After the biometric information is verified, an electronic device 102 may receive 210 a signature of the blinded token from the verifier 104 if corresponding biometric information is not stored by the verifier 104. The signature may be a blinded signature based on the same blinding factor used in blinding the token. The signature may be an indication that the biometric information does not correspond to already stored biometric information on the verifier 104. Thus, the received signature of the token from the verifier 104 may be used to verify an enrollment status of a patient corresponding to the biometric information sent to the verifier 104.

Figure 3:
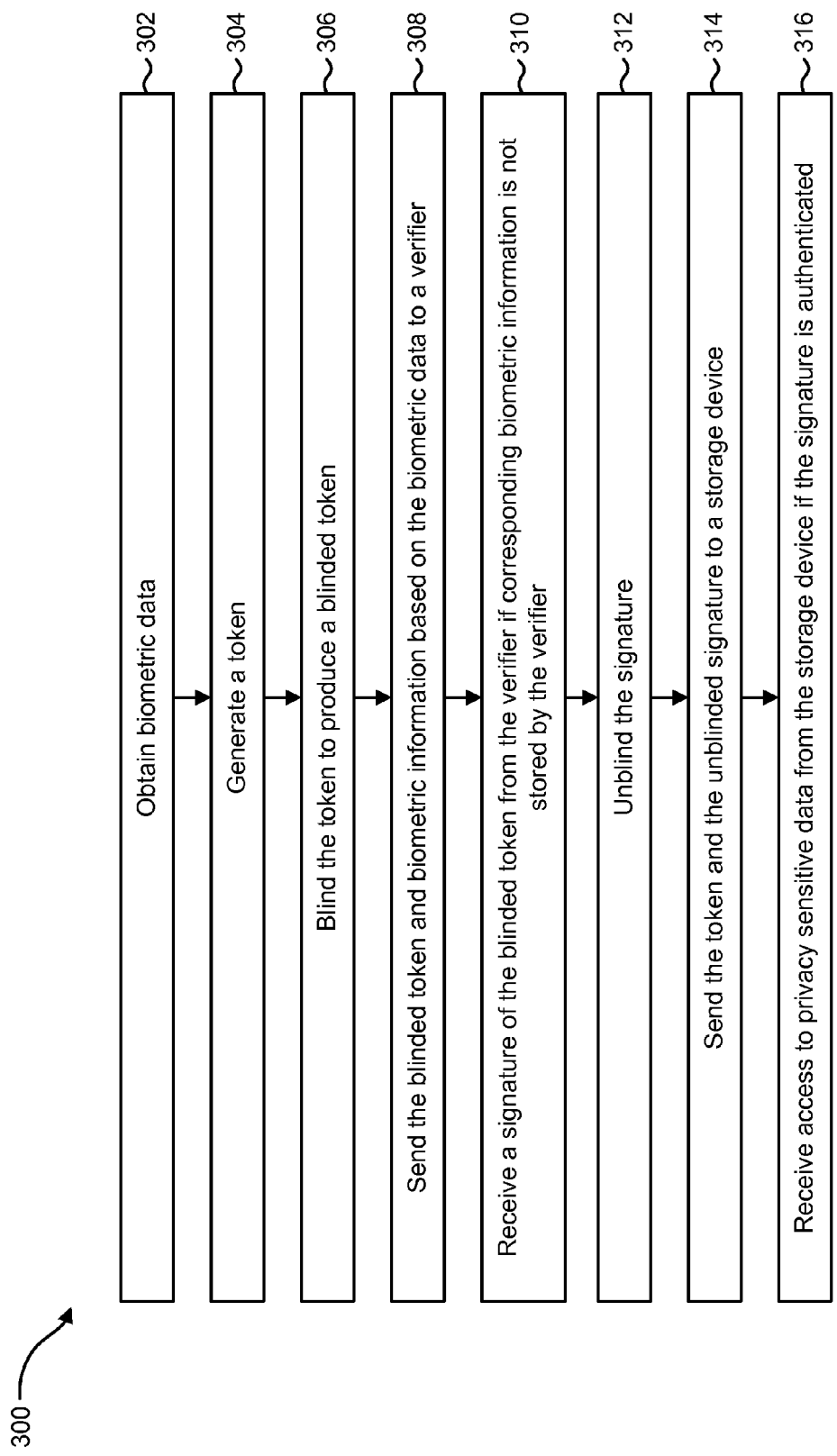
FIG. 3 is a flow diagram illustrating a more detailed configuration of a method for verifying uniqueness in anonymous authentication.

FIG. 3 is a flow diagram illustrating a more detailed configuration of a method 300 for verifying uniqueness in anonymous authentication. The method 300 may be performed by an electronic device 102. Further, the method 300 may be performed by a single electronic device 102 or separately by different electronic or computing devices.

Biometric data may be obtained 302. A token may also be generated 304. The token may be blinded 306 to produce a blinded token. Biometric information based on the biometric data may be sent 308 to a verifier. The blinded token may also be sent 308 to the verifier. After the biometric information is verified, an electronic device 102 may receive 310 a signature of the blinded token from the verifier 104 if corresponding biometric information is not stored by the verifier 104. Obtaining 302 biometric data, generating 304 a token, blinding 306 the token to produce a blinded token, sending 308 the blinded token to the verifier 104 and receiving 310 a signature of the blinded token from the verifier 104 if corresponding biometric information is not stored by the verifier 104 may be accomplished as described above in connection with FIG. 1 and FIG. 2.

The signature may also be unblinded 312. Unblinding 312 the signature may be performed using a similar blinding factor or unblinding factor. Thus, the electronic device may obtain an unblinded signature. The token and the unblinded signature may be sent 314 to a storage device 106. The token and unblinded signature may be sent 314 to the storage device over a network 108. In some configurations, the storage device 106 may be a health database system. For example, the storage device 106 may include a medical record and patient security (MRPS) system. The signature may be an indication that the electronic device 102 or a patient associated with biometric data has been verified by a verifier 104. Thus, the token and the signature may be an indication of a trusted relationship between the verifier 104 and the electronic device 102 as it pertains to the biometric data obtained from a patient. The storage device 106 may determine whether the signature originates from a registered or trusted verifier 104, and whether biometric information has been properly verified by the verifier 104 or other device.

An electronic device 102 may receive 316 access to privacy sensitive information from the storage device 106 if the signature is authenticated. Authenticating a signature may be performed by the storage device 106. Receiving authentication may be in response to the storage device 106 determining that the signature is valid and/or originates from a registered verifier 104. The electronic device 102 may also transmit the privacy sensitive information over the network 108 from the storage device 106. In some configurations, the privacy sensitive information may be personal data, medical records or other information that a patient may want to remain private. In some configurations, the privacy sensitive information may be protected by additional encryption or require additional information other than the signature for obtaining and/or decrypting the privacy sensitive information. For example, the privacy sensitive information may be protected by requiring a personal identification number (PIN), private and public key pairs, additional biometric identification or other information for verifying the identity of a patient seeking access to the privacy sensitive information. Thus, the privacy sensitive information may include any number of security measures, in addition to requiring a verified signature, prior to providing access to the privacy sensitive information to an electronic device 102.

In some configurations, any self-verifying information, such as the unblinded signature, token or private and public key pairs may be stored on a device and/or storage medium (e.g., smart card). For example, a smart card may be provided to a patient such that only the patient may provide information necessary for accessing the privacy sensitive information. Alternatively, one or more additional smart cards may be programmed and provided to primary account holders, employers, dependents, etc., in cases where multiple people or a limited group of people may obtain access to the privacy sensitive information through the use of a smart card.

Figure 4:
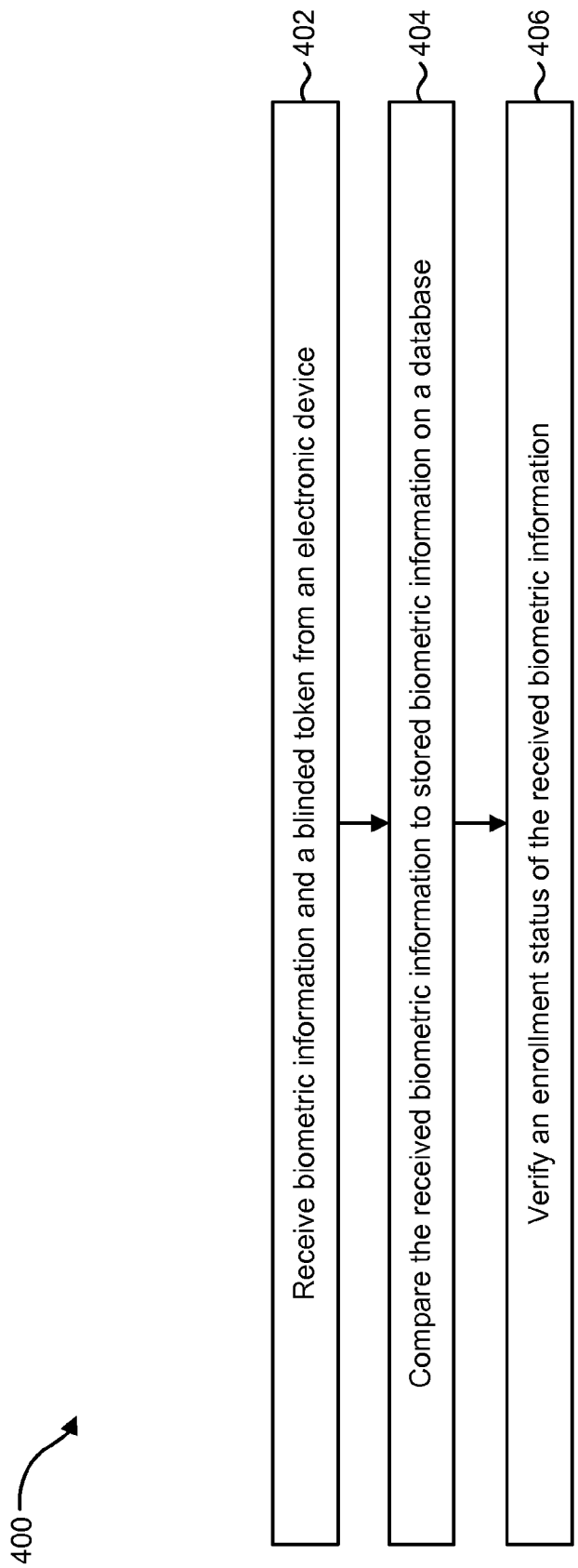
FIG. 4 is a flow diagram illustrating another configuration of a method for verifying uniqueness in anonymous authentication.

FIG. 4 is a flow diagram illustrating another configuration of a method for verifying uniqueness in anonymous authentication. In one configuration, the method 400 may be performed by a verifier 104.

Biometric information and a blinded token may be received 402 from an electronic device 102. The biometric information may be based on biometric data obtained using an electronic device 102. In some configurations, the biometric information may include some or all of the biometric data or a biometric template based on the biometric data. The received biometric information may be compared to biometric information stored on the biometric database 122. Accordingly, the received biometric information may be utilized to determine whether it corresponds to biometric information already stored on a biometric database 122. The received blinded token may be blinded by the electronic device 102 according to a blinding factor. The blinded token may be received without a blinding factor such that a verifier 104 may not decrypt or unblind the blinded token without additional information from the electronic device 102. Therefore, a verifier 104 may be unable to unblind the blinded token to determine a number or sequence of numbers corresponding to an original unblinded token.

The received biometric information may be compared 404 to biometric information stored on a database. The database may be a biometric database 122. The biometric database 122 may include multiple types of biometric information corresponding to one or more patients who have previously provided biometric data. The biometric information for each patient may be stored on the biometric database 122 as biometric information is received and verified against biometric information previously received from one or more electronic devices 102. The received biometric information may be compared to biometric information stored on the biometric database 122 to determine whether the received biometric information matches or corresponds to any of the biometric information stored on the biometric database 122. A verifier 104 or other computing device may then determine whether a patient corresponding to the received biometric information is a new patient (e.g., corresponding biometric information is not stored on the verifier 104) or an already existing patient (e.g., corresponding biometric information is already stored on the verifier 104). The received biometric information may also be stored on the verifier 104 for later comparisons with biometric information on the biometric database 122.

An enrollment status of the received biometric information may be verified 406. Verifying an enrollment status may include determining whether the received biometric information corresponds to biometric information stored on a biometric database 122. If corresponding biometric information is already stored on the biometric database 122, an enrollment status of the biometric information may be determined to be previously verified or enrolled. Alternatively, if corresponding biometric information is not stored on the biometric database 122, an enrollment status of the biometric information may be determined as not previously verified or not enrolled.

In one configuration, if the received biometric information has not been previously verified, a signature of the blinded token may be generated and the received biometric information may be stored on a biometric database 122. Generating a signature of the token may include signing the blinded token to produce a blinded signature. Thus, the verifier 104 may produce a blinded signature in response to determining that the received biometric information does not correspond to any of the biometric information stored on the biometric database 122. Verifying an enrollment status of the received biometric information may also include sending a signature of the blinded token to the electronic device 102. The signature may be sent in response to determining that the received biometric information does not match any of the biometric information stored on the biometric database 122. The signature may be blinded according to the same blinding factor used to blind the received token. In some configurations, the verifier 104 may send both the signature and the blinded token to the electronic device 102. Alternatively, if it is determined that the received biometric information is already stored on the biometric database 122, a verifier 104 may send an indication of the already existing biometric information rather than sending a signature to the electronic device 102.

Figure 5:
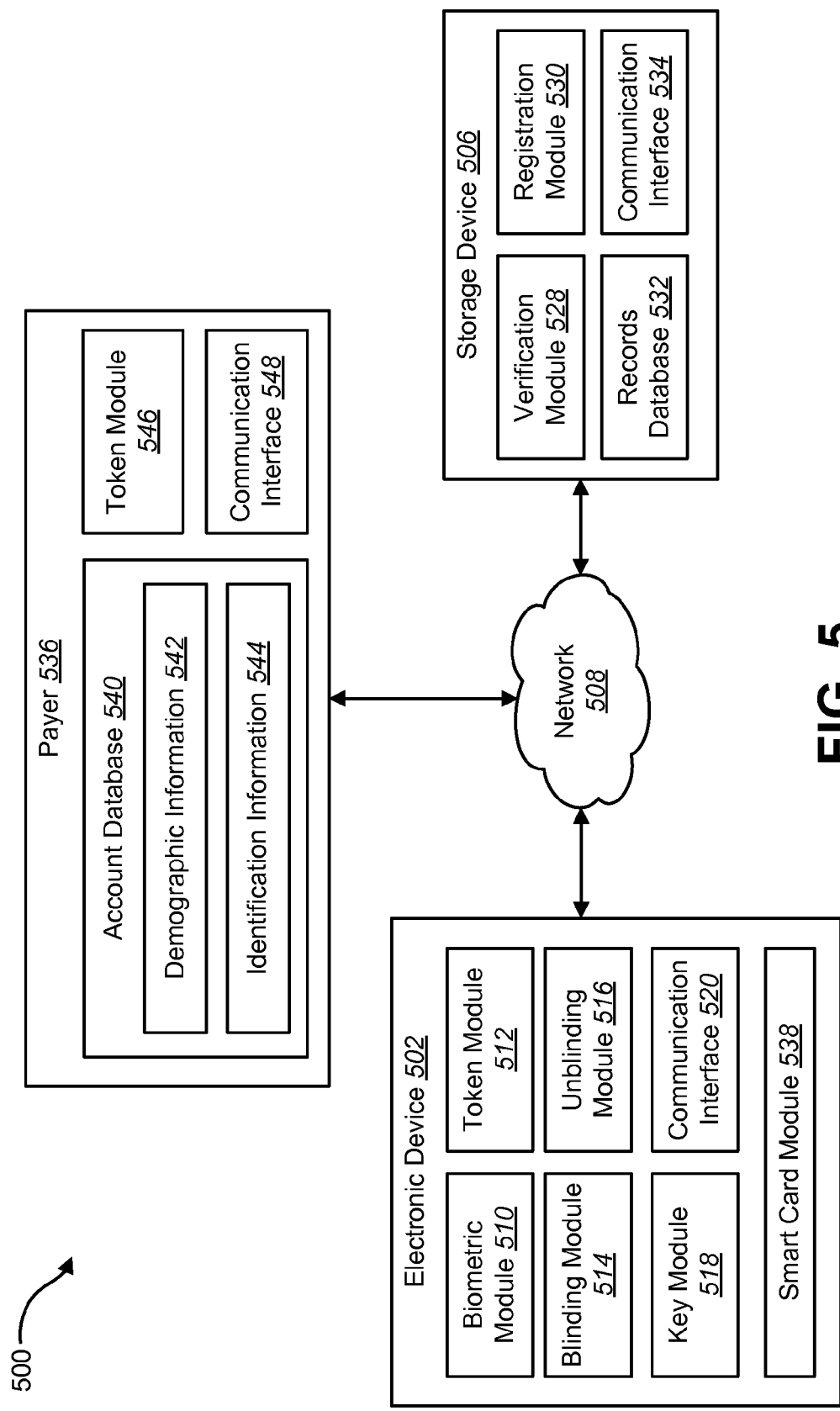
FIG. 5 is a block diagram illustrating another configuration of a system for verifying uniqueness in anonymous authentication.

FIG. 5 is a block diagram illustrating another configuration of a system 500 for verifying uniqueness in anonymous authentication. The system 500 may include components of the system 100 described above in connection with FIG. 1. The system 500 may include an electronic device 502, a storage device 506 and a payer. The electronic device 502 and the storage device 506 may be similar to the electronic device 102 and storage device 106 described above in connection with FIG. 1.

The storage device 506 may be used to store privacy sensitive information. The storage device 506 may include a verification module 528, registration module 530, records database 532 and a communication interface 534. The verification module 528, registration module 530, records database 532 and communication interface 534 may include similar components and functionality as the verification module 128, registration module 130, records database 132 and communication interface 134 described above in connection with FIG. 1.

The electronic device 502 may include a biometric module 510, a token module 512, a blinding module 514, an unblinding module 516, a key module 518 and a communication interface 520. The biometric module 510, token module 512, blinding module 514, unblinding module 516, key module 518 and communication interface 520 may include similar components and functionality as the biometric module 110, token module 112, blinding module 114, unblinding module 116, key module 118 and communication interface 120 described above in connection with FIG. 1.

The electronic device 502 may also include a smart card module 538. The smart card module 538 may be used for programming one or more smart cards. For example, the smart card module 538 may store one or more keys, tokens, signatures or other data on a smart card or other storage medium. A smart card may be used for anonymously providing verification data or other identifying data about a patient. For example, a smart card having a token and/or a signature may be used to provide a token and/or a signature to a storage device 506. As described above, the signature and token may be used to verify biometric data and/or a patient seeking access to privacy sensitive information. The smart card may also be used to provide encryption or decryption keys (e.g., private keys and public keys) to one or more storage devices 506 or a verifier 104 for verifying the identity of a patient and/or providing any necessary information for accessing privacy sensitive information while preserving the privacy and autonomy of a patient in possession of the smart card.

The payer 536 may include an account database 540. The account database 540 may include various types of information about a patient. For example, the account database 540 may include demographic information 542, identification information 544 or other types of information other than biometric information corresponding to a patient. The demographic information 542 may include personal information, such as a name, address, location, gender, age, ethnicity or other demographic information that may be used in identifying or verifying the identity of a patient. In some configurations, the demographic information 542 does not include biometric information about a patient. The account database 540 may also include identification information 544, such as a social security number (SSN), employer or other information that may be used in identifying or verifying a patient. In some configurations, the identification information 544 does not include biometric information about a patient. Thus, the account database 540 may include various types of data corresponding to a patient other than biometric information.

The payer 536 may include a token module 546. The token module 546 may be a hardware and/or a software module used to generate one or more tokens. A token generated using the token module 546 may be a one-time use token used to authenticate an electronic device 502 or a patient with a storage device 506. The tokens may be generated based on demographic information 542, identification information 544 or other information other than biometric information.

The payer 536 may also include a communication interface 548. The communication interface 548 may be a hardware and/or software module used to communicate with one or more electronic and computing devices. The communication interface 548 may be used to send and receive communications to the electronic device 502 and the storage device 506 over the network 508.

In some cases, a signature, token, key or other piece of data is stored on a smart card without a backup. Thus, the smart card may be the only device on which certain data is stored. If the smart card is subsequently lost, it may be difficult or impossible to obtain access to privacy sensitive information, even with express permission of a patient associated with the privacy sensitive information. In one configuration, a payer 536 may be used to assist in retrieving data for re-programming a smart card and/or verifying biometric information of a patient seeking access to privacy sensitive information stored on a storage device 506.

A patient or other individual may communicate with the payer 536 using one or more electronic devices 502. In one configuration, an electronic device 502 may send an indication for a replacement of a smart card. This may be due to a smart card being lost or for purposes of updating information on the smart card. The electronic device 502 and/or patient may authenticate to the payer through a variety of ways. For example, the electronic device 502 may provide demographic information 542 and/or identification information 544 corresponding to a patient. The demographic information 542 and/or identification information 544 may be compared to information already stored on an account database to determine whether the demographic information 542 and/or identification information 544 corresponds to the patient requesting a new smart card. Once the demographic information 542 and/or identification information 544 is authenticated, the payer 536 may provide one or more one-time use tokens to the electronic device 502 for authenticating a patient or electronic device 502 with the storage device 506.

Using the one or more one-time use tokens, the electronic device 502 may program a new smart, storing the one or more tokens on the smart card. Additionally, the electronic device 502 may provide a new or replacement key, token or other data to store on the smart card for future authentication with the storage device 506. The one-time use token may be provided to the storage device 506. The storage device 506 may determine that the one-time use token originated from the payer 536 or other registered device. If it is determined that the one-time use token is valid, the storage device 506 may provide an encryption key (e.g., a public key) to the electronic device, which may be stored on the smart card for later use. In some configurations, the storage device 506 may re-encrypt any privacy sensitive information on the storage device 506 previously encrypted using an old or outdated key. The storage device 506 may also delete any of the privacy sensitive information encrypted using the old key.

In another configuration, any data for re-issuing a new smart card may be obtained from a second smart card issued to a spouse, employer or other backup card maintained on the electronic device 502 or other smart card. Therefore, in re-issuing a smart card, an electronic device 502 may program a first smart card and a second smart card (e.g., as a backup or provided to a second individual). Where multiple smart cards are issued, rather than sharing personal information back with a payer 536, the electronic device 502 would be able to reprogram the smart card using the second smart card. As an additional level of security, reprogramming the smart card may require a verification using a PIN, biometric data or other data that may be used to verify the identity of a patient with a corresponding smart card.

By interacting with a payer 536, privacy sensitive information, including medical records or a medical history for a patient may be obtained without the use of a smart card. While a smart card may be useful for providing an additional level of anonymity, the payer 536 may provide a token as a way of preventing the identity of a patient associated with certain biometric data or privacy sensitive information from being known to a health care provider, a clinic or other person seeking access to privacy sensitive information on the storage device 506. Thus, even without a smart card, anonymity of privacy sensitive information may be reasonably protected.

Figure 6:
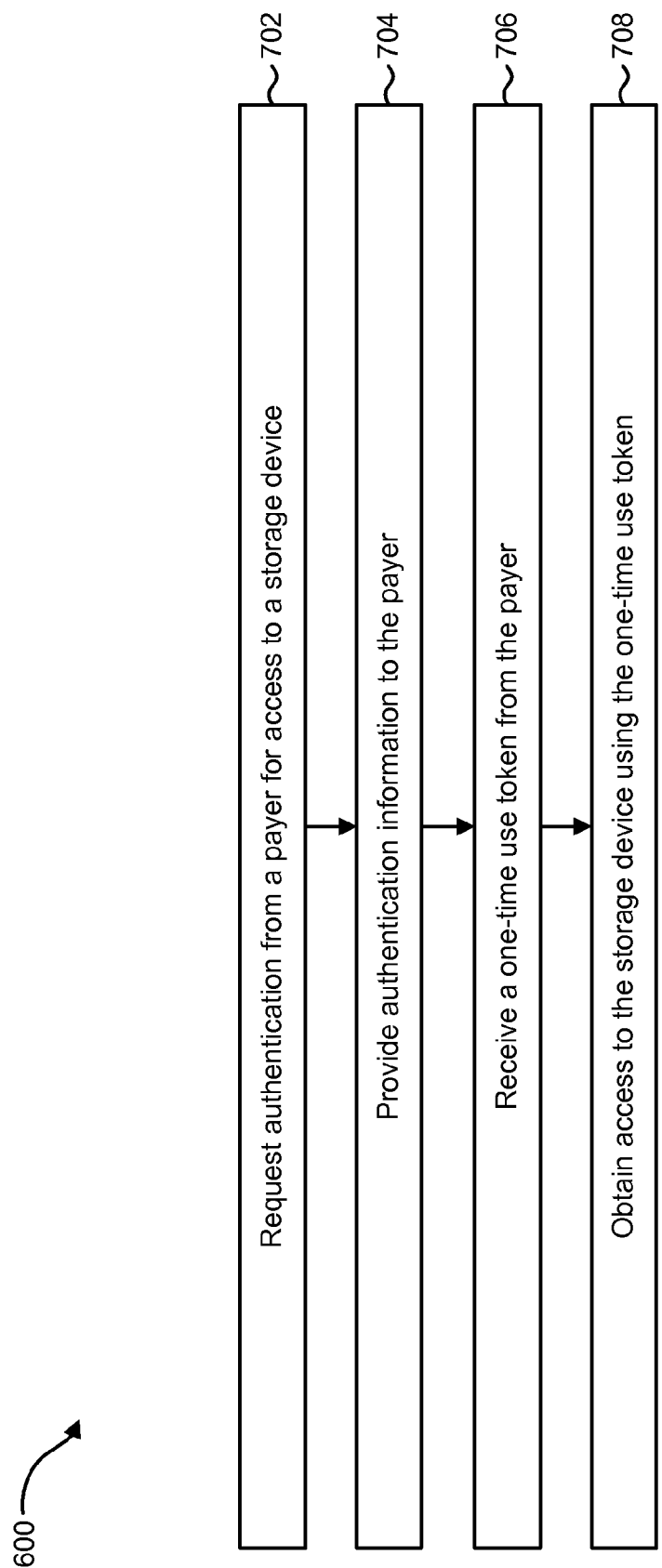
FIG. 6 is a flow diagram illustrating a method for verifying uniqueness in anonymous authentication when re-issuing a smart card.

FIG. 6 is a flow diagram illustrating one configuration of a method 600 for verifying uniqueness in anonymous authentication when re-issuing a smart card. In one configuration, the method 600 may be performed by an electronic device 502.

An electronic device 502 may request 602 authentication from a payer 536 for access to a storage device 506. Requesting 602 authentication may include requesting necessary data that may be used to verify the identity of a patient to a storage device 506. In some configurations, requesting 602 authentication may include requesting any necessary data for programming a smart card that may be used for obtaining privacy sensitive information from a storage device 506.

The electronic device 502 may provide 604 authentication information to a payer 536. Authentication information may include various types of information other than biometric information that may be used for identifying or authenticating the identity of a patient. Information that may be provided may include demographic information 542 and/or identification information 544 about a patient. The payer 536 may compare the demographic information 542 and/or identification information 544 to information stored on an account database 540.

The electronic device 502 may receive 606 a one-time use token from the payer 536. The one-time use token may be stored on the electronic device 502 or stored on a smart card. The one-time use token may be sent to the storage device 506 from the electronic device 502 or by scanning a smart card with the one-time use token stored on the smart card. Thus, the electronic device 502 may provide the one-time use token to the storage device 506 for authenticating a patient seeking to obtain access to privacy sensitive information.

The electronic device 502 may obtain 608 access to the storage device 506 using the one-time use token. By sending the one-time use token to the storage device 506, the storage device 506 may determine whether the one-time use token originates from a recognized or trusted payer 536. If the one-time use token is valid, the storage device 506 may grant access to privacy sensitive information to a patient and/or electronic device 502.

Figure 7:
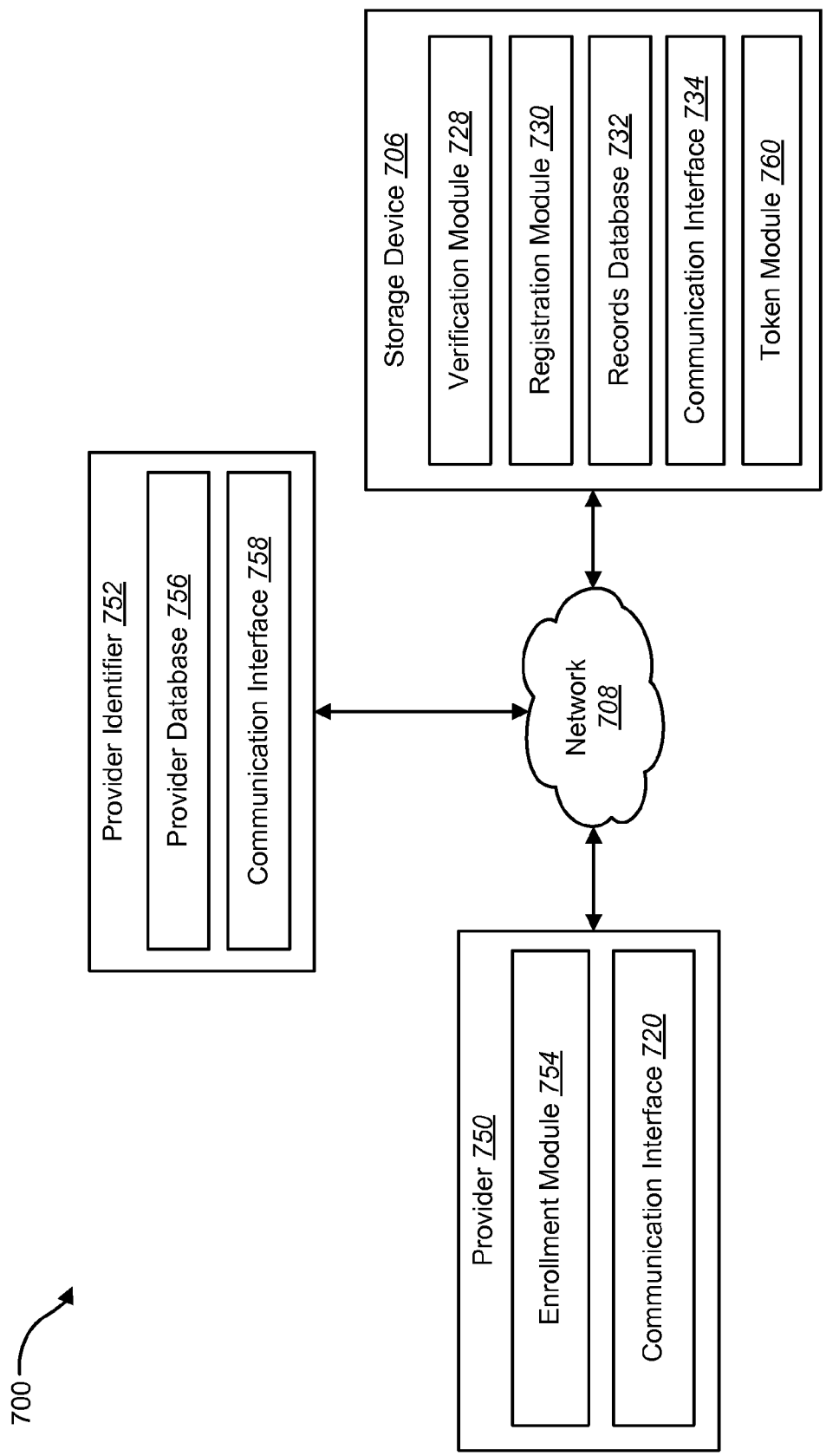
FIG. 7 is a block diagram illustrating one configuration of a system for enrolling a provider for access to privacy sensitive information on a storage device.

FIG. 7 is a block diagram illustrating one configuration of a system 700 for enrolling a provider 750 for access to privacy sensitive information on a storage device 706. The system 700 may include components of the system 100 described above in connection with FIG. 1. The system 700 may include a provider 750, a provider identifier 752 and a storage device 706. The provider 750 and the storage device 706 may include similar components and functionality as the electronic device 102 and the storage device 106 described above in connection with FIG. 1.

The provider 750 may include an enrollment module 754. The enrollment module 754 may include hardware and/or software for enrolling the provider 750 with a storage device 706. This may include providing an identification number and/or other identifying information of the provider 750 that the storage device 706 may use in authenticating the provider 750. The provider 750 may also include a communication interface 720 similar to the communication interface 120 described above in connection with claim 1.

The provider identifier 752 may include a provider database 756. The provider database 756 may include a list of providers or include information about each provider currently registered on a database of verified providers. In one configuration, the provider database 756 is the National Provider Identifier (NPI) Registry, including National Plan and Provider Enumeration System (NPPES) information corresponding to multiple providers on the NPI Registry. The provider identifier 752 may also include a communication interface 758 for communicating with the storage device 706 and the provider 750 over the network 708.

The storage device 706 may include a verification module 728, registration module 730, records database 732 and communication interface 734. The verification module 728, registration module 730, records database 732 and communication interface 734 may be similar to similar to the verification module 128, registration module 130, records database 132 and communication interface 134 described above in connection with FIG. 1.

The storage device 706 may also include a token module 760. If the provider 750 is authenticated (e.g., registered on the NPI Registry), the storage device 706 or other device with access to the records database 732 may generate two one-time use tokens and provide the one-time use tokens to the provider 750 for later access to privacy sensitive information on the storage device 706. The two one-time use tokens may be based on information about the provider 750 in the provider database 756. For example, the tokens may be based on a phone number, fax number, email, physical address or other information about the provider 750 stored on the provider database 756. Using the one-time use tokens, the provider 750 may log into the storage device 706, set a password and create an account for the provider 750 and/or users associated with the provider 750 for later accessing privacy sensitive information on the storage device 706. In some configurations, the storage device may include a single sign-on system that could be leveraged. In this case, a provider 750 may be linked with the storage device 706 without a password authentication. In some cases, access to the privacy sensitive information may also require information provided from a patient smart card, in addition to a password and/or account information from the provider 750.

Figure 8:
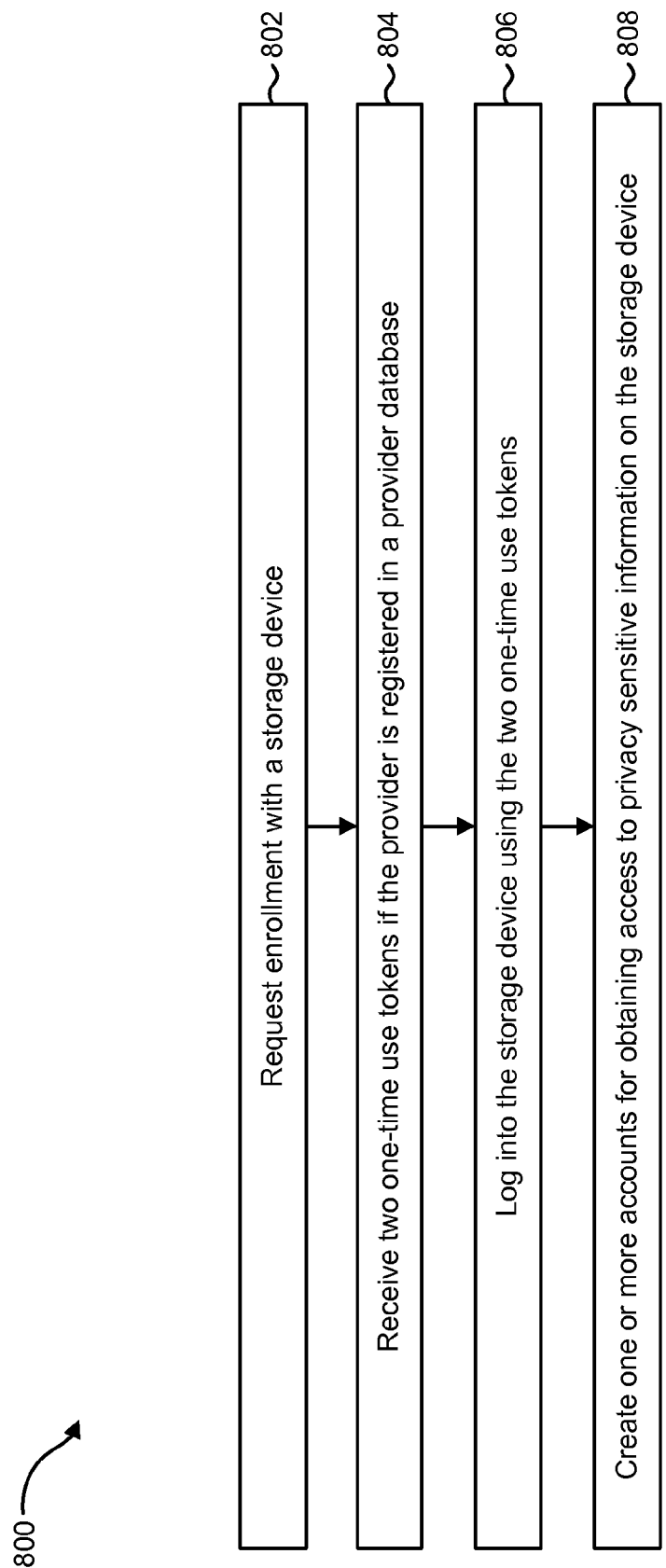
FIG. 8 is a flow diagram illustrating one configuration of a method for enrolling a provider for access to privacy sensitive information on a storage device.

FIG. 8 is a flow diagram illustrating one configuration of a method 800 for enrolling a provider 750 for access to privacy sensitive information on a storage device 706. In one configuration, the method 800 may be performed by a provider 750.

A provider 750 may request 802 enrollment with a storage device 706. The provider 750 may be a health care provider seeking access to privacy sensitive information, such as medical records, stored on the storage device 706. The storage device 706 may verify the identity or status of a provider 750 by comparing information provided from the provider 750 to a provider database 756. The provider database 756 may include the NPI registry. If the provider 750 is registered, the storage device 706 may generate two one-time use tokens for registering with the storage device 706.

The provider 750 may receive 804 the two one-time use tokens if the provider 750 is registered in the provider database 756. These one-time use tokens may be based on information about the provider 750 in the provider database 756. For example, the tokens may be based on a phone number, fax number, email, physical address or other information about the provider 750 stored on the provider database 756. The provider 750 may log 806 into the storage device 706 using the two one-time use tokens. Further, the provider 750 may set a new password and create 808 one or more accounts for obtaining access to the privacy sensitive information on the storage device 706. Each account may correspond to one or more users associated with the provider 750.

Figure 9:
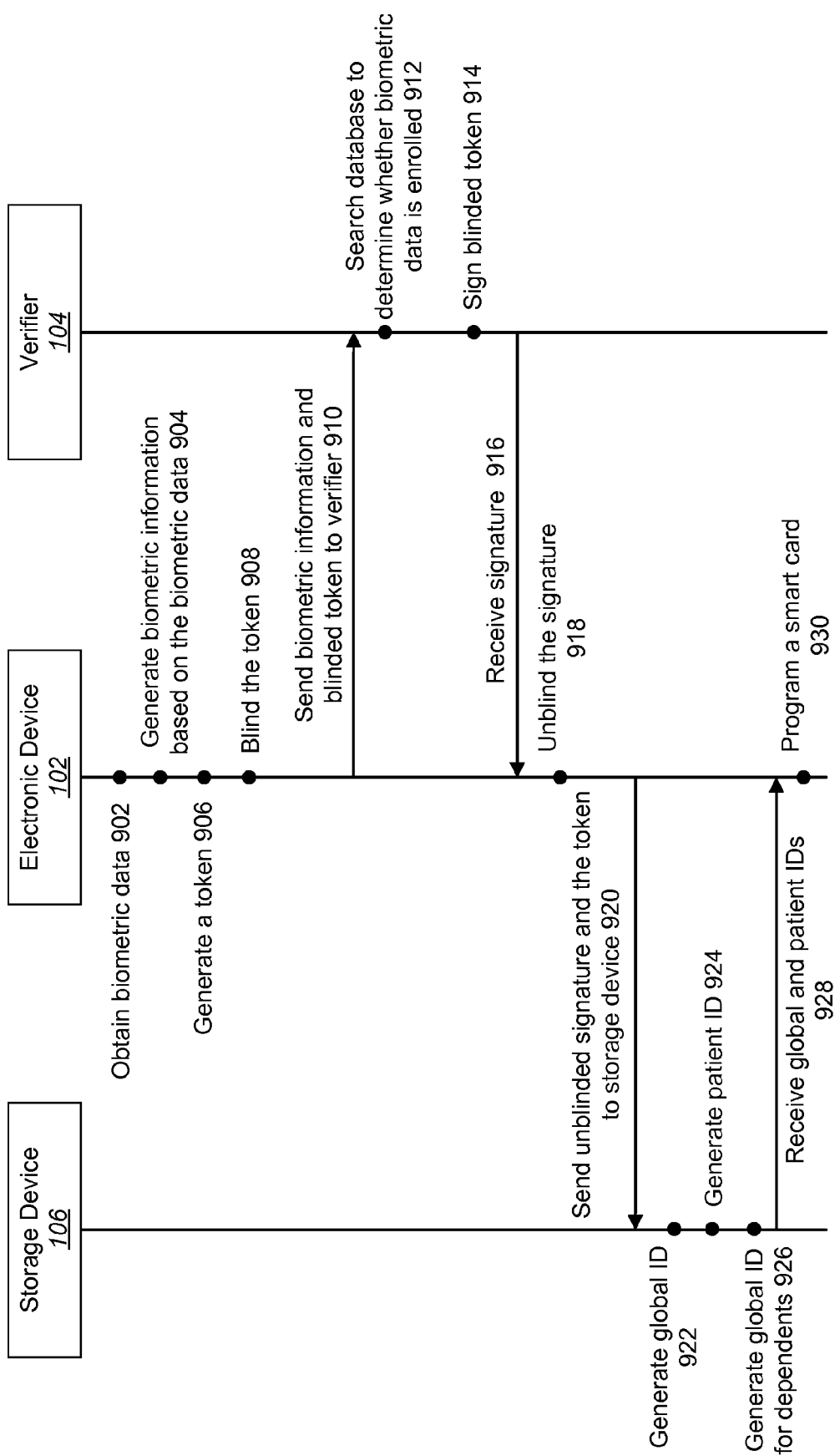
FIG. 9 is a thread diagram illustrating an example of verifying uniqueness in anonymous authentication in a system.

FIG. 9 is a thread diagram illustrating an example of verifying uniqueness in anonymous authentication in a system. An electronic device 102 may obtain 902 biometric data. The electronic device 102 may also generate 904 biometric information based on the biometric data. The electronic device 102 may also generate 906 a token. Further, the electronic device 102 may blind 908 the token by using a blinding factor. The electronic device 102 may then send 910 the biometric information based on the biometric data and the blinded token to a verifier 104.

The verifier 104 may receive the biometric information from the electronic device 102. The verifier 104 may search 912 a database to determine whether the biometric data is enrolled. The biometric information may already be enrolled if corresponding biometric information is already stored on the verifier 104. If the biometric data is already enrolled, the verifier 104 may send the biometric information and blinded token back to the electronic device 102 or alternatively send an indication that the biometric information corresponds to biometric information already enrolled on the verifier 104. In the case that the biometric information is not already enrolled, the verifier 104 may sign 914 the blinded token to generate a signature. The signature may be a blinded signature. The verifier 104 may send the signature to the electronic device.

The electronic device 102 may receive 916 the signature from the verifier 104. The received signature may be a blinded signature based on the same blinding factor as the blinded token. The electronic device 102 may unblind 918 the signature to produce an unblinded signature. The electronic device 102 may send 920 the unblinded signature and token to a storage device 106.

The storage device 106 may receive the unblinded signature and the token from the electronic device 102. In response to receiving the signature, the storage device 106 may generate 922 a global identification for a patient. The storage device 106 may also generate 924 a patient identification and link the patient identification with a global identification and a payer. In some configurations, the storage device 106 may generate 926 a global identification for all dependents and link them to the patient. The storage device 106 may then send the global identifications and patient identification to the electronic device 102.

The electronic device 102 may receive 928 the global identifications and the patient identification from the storage device 106. Using the token, signature, keys, global identifications, patient identification and/or other data, the electronic device 102 may program 930 a smart card. In one configuration, the electronic device 102 may program 930 a smart card by storing data, such as the global and patient identifications, on the smart card. Additionally or alternatively, the electronic device 102 may store one or more public and private key combinations on the smart card. The electronic device 102 may also store other information, such as tokens, signatures and other data on the smart card for authentication or verification of a patient or electronic device 102. The smart card may be used by a patient in providing tools for encrypting or decrypting privacy sensitive information or alternatively in verifying the identity of a patient for granting permission for an electrical device 102 or other device to access privacy sensitive information on a storage device 106.

Figure 10:
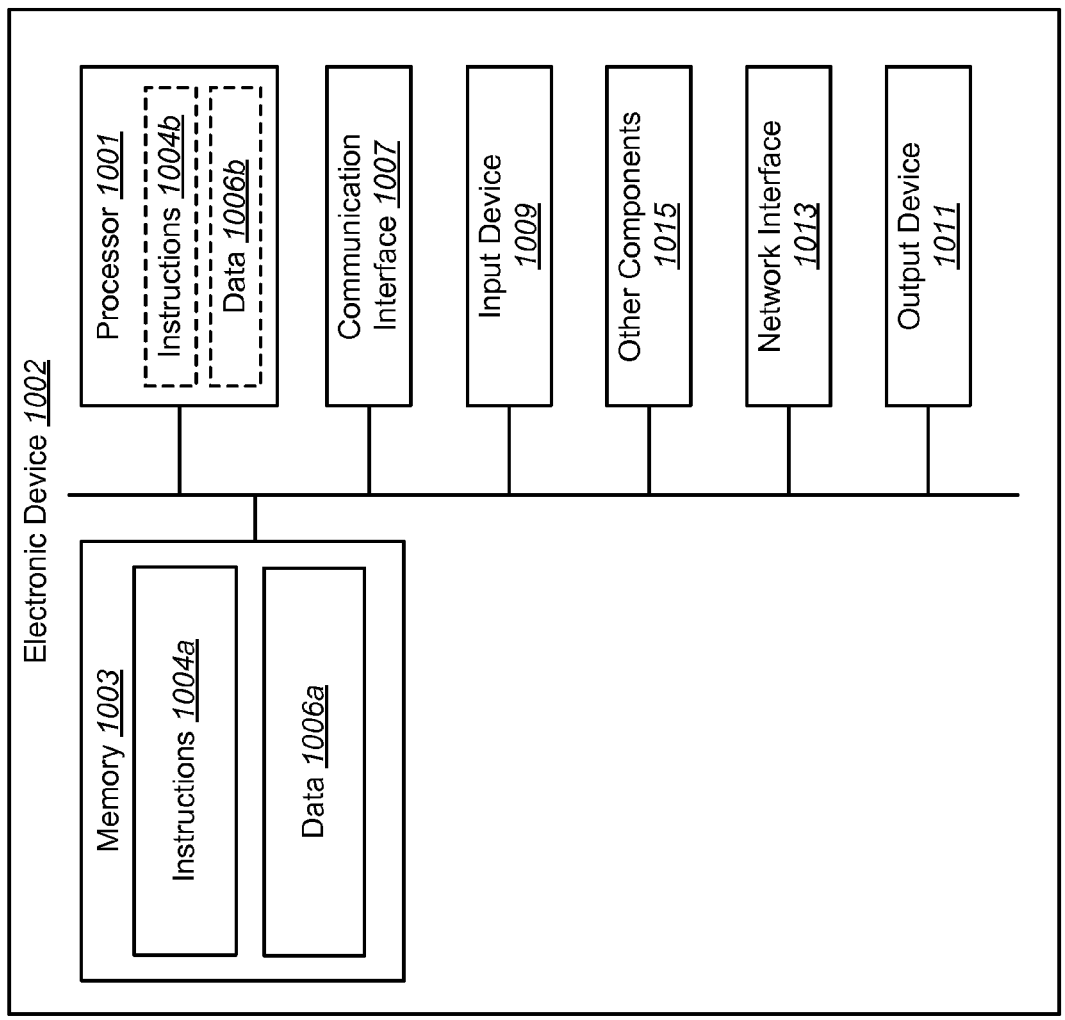
FIG. 10 is a block diagram illustrating various components that may be utilized in an electronic device.

FIG. 10 is a block diagram illustrating various components that may be utilized in an electronic device, verifier and/or a storage device. Although only one electronic device 1002 is shown, the configurations herein may be implemented in a distributed system using many computer systems. The electronic device 1002 may include the broad range of digital computers, including microcontrollers, hand-held computers, personal computers, servers, mainframes, supercomputers, minicomputers, workstations and any variation or related device thereof.

The electronic device 1002 is shown with a processor 1001 and memory 1003. The processor 1001 may control the operation of the electronic device 1002 and may be embodied as a microprocessor, a microcontroller, a digital signal processor (DSP) or other device known in the art. The processor 1001 typically performs logical and arithmetic operations based on program instructions 1004a stored within the memory 1003. The instructions 1004a in the memory 1003 may be executable to implement the methods described herein.

The electronic device 1002 may also include one or more communication interfaces 1007 and/or network interfaces 1013 for communicating with other electronic devices. The communication interface(s) 1007 and the network interface (s) 1013 may be based on wired communication technology and/or wireless communication technology.

The electronic device 1002 may also include one or more input devices 1009 and one or more output devices 1011. The input devices 1009 and output devices 1011 may facilitate user input/user output. Other components 1015 may also be provided as part of the electronic device 1002.

Data 1006a and instructions 1004a may be stored in the memory 1003. The processor 1001 may load and execute instructions 1004b from the instructions 1004a in memory 1003 to implement various functions. Executing the instructions 1004a may involve the use of the data 1006b that is loaded from the memory 1003. The instructions 1004a are executable to implement one or more of the processes or configurations shown herein, and the data 1006a may include one or more of the various pieces of data described herein.

The memory 1003 may be any electronic component capable of storing electronic information. The memory 1003 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. In addition, "determining" can include receiving (e.g., receiving information), accessing (e.g., accessing data in a memory) and the like. Further, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 3, 4, 6 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for anonymous authentication by an electronic device, comprising:
   obtaining biometric data;
   generating a token;
   blinding the token to produce a blinded token, wherein blinding the token comprises performing one or more arithmetic operations on the token based on a blinding factor;
   sending the blinded token and biometric information based on the biometric data to a verifier;
   receiving a signature of the blinded token from the verifier if matching biometric information is not stored by the verifier;
   unblinding the received signature to produce an unblinded signature;
   generating a public key and a private key; and
   storing the public key, the signature and the token on a smart card, wherein the smart card is used to obtain access to a medical record of a patient.

2. The method of claim 1, further comprising sending the token and the signature to a storage device.

3. The method of claim 2, further comprising obtaining access to privacy sensitive information from the storage device if the signature is authenticated by the storage device.

4. The method of claim 1, further comprising:
   obtaining additional biometric data;
   sending additional biometric information based on the additional biometric data to the verifier to determine whether the additional biometric information corresponds to biometric information stored on the verifier; and
   receiving an indication from the verifier whether the additional biometric information corresponds to biometric information stored on the verifier.

5. The method of claim 4, further comprising receiving an indication that a patient associated with the additional biometric information has previously received a signature for obtaining access to privacy sensitive information.

6. The method of claim 1, further comprising encrypting privacy sensitive information using the public key.

7. The method of claim 1, further comprising authenticating a signature and a token using the public key.

8. The method of claim 1, further comprising decrypting privacy sensitive information using the private key.

9. The method of claim 1, further comprising:
   request authentication from a payer for access to a storage device;
   provide authentication information to the payer;
   receive a one-time use token from a payer; and obtain access to the storage device using the one-time use token.

10. The method of claim 9, further comprising generating a replacement smart card upon receiving a new signature.

11. The method of claim 1, further comprising:
generating a new token;
sending biometric data and the new token to the verifier;
receiving a new signature and the new token; and
enrolling the new signature with a storage device.

12. An electronic device for performing anonymous authentication, comprising:
a processor;
memory in electronic communication with the processor; and
instructions stored in memory, the instructions being executable to:
obtain biometric data;
generate a token;
blind the token to produce a blinded token, wherein blinding the token comprises performing one or more arithmetic operations on the token based on a blinding factor;
send the blinded token and biometric information based on the biometric data to a verifier;
receive a signature of the blinded token from the verifier if matching biometric information is not stored by the verifier;
unblind the received signature to produce an unblinded signature;
generate a public key and a private key; and
store the public key, the signature and the token on a smart card, wherein the smart card is used to obtain access to a medical record of a patient.

13. The electronic device of claim 12, wherein the instructions are further executable to send the token and the signature to a storage device.

14. The electronic device of claim 12, wherein the instructions are further executable to receive privacy sensitive information from a storage device if the signature is authenticated.

* * * * *